(12) United States Patent
Jacumet

(10) Patent No.: US 7,948,522 B2
(45) Date of Patent: May 24, 2011

(54) METHOD FOR PROCESSING FILM IMAGES EXTRACTED FROM A FILM RECORDING BEAM PATH OF A MOVING IMAGE CAMERA

(75) Inventor: Klaus Jacumet, Munich (DE)

(73) Assignee: Arnold & Ritcher Cine Technik GmbH & Co. Betriebs KG, Munich (DE)

( * ) Notice: Subject to any disclaimer, the term of this patent is extended or adjusted under 35 U.S.C. 154(b) by 641 days.

(21) Appl. No.: 11/794,853

(22) PCT Filed: Jan. 4, 2006

(86) PCT No.: PCT/DE2006/000014
§ 371 (c)(1),
(2), (4) Date: Apr. 10, 2008

(87) PCT Pub. No.: WO2006/072236
PCT Pub. Date: Jul. 13, 2006

(65) Prior Publication Data
US 2009/0046155 A1    Feb. 19, 2009

(30) Foreign Application Priority Data

Jan. 10, 2005   (DE) .......................... 10 2005 001 652

(51) Int. Cl.
*H04N 5/225* (2006.01)
(52) U.S. Cl. ....................................... 348/220.1; 348/97
(58) Field of Classification Search ............ 348/97–107, 348/362–364, 368, 64, 220.1, 221.1, 224.1; 396/429, 505
See application file for complete search history.

(56) References Cited

U.S. PATENT DOCUMENTS

| | | | |
|---|---|---|---|
| 4,660,091 A | * | 4/1987 | Nutting ........................... 348/96 |
| 4,928,171 A | * | 5/1990 | Kline .............................. 348/64 |
| 6,161,933 A | | 12/2000 | Tschida et al. |
| 6,353,461 B1 | * | 3/2002 | Shore et al. ................... 348/722 |
| 6,749,304 B2 | | 6/2004 | Jacumet |

(Continued)

FOREIGN PATENT DOCUMENTS

DE    100 20 307 A1    10/2001
DE    103 01 714 A1     7/2004

(Continued)

OTHER PUBLICATIONS

English translation of International Preliminary Report on Patentability dated Aug. 14, 2007 corresponding to PCT/DE2006/000014.

(Continued)

*Primary Examiner* — Tuan Ho
(74) *Attorney, Agent, or Firm* — Christie, Parker & Hale, LLP

(57) ABSTRACT

A method for processing film images which are extracted from a recording beam path of a moving image camera and which are converted into digital assist signals by an optoelectronic transducer arranged in an assist beam path of the moving image camera is provided. Said assist beam path being interrupted periodically depending on the image recording frequency of the moving image camera, which digital assist signals are output to a processing unit with an image frequency matching the image recording frequency of the moving image camera or with an assist image frequency, to which processing unit recording, control and/or status signals of the moving image camera or of devices connected to the moving image camera are fed as metadata. The processing unit contains image conditioning functions and/or image analysis functions.

27 Claims, 7 Drawing Sheets

U.S. PATENT DOCUMENTS

| | | | | |
|---|---|---|---|---|
| 6,757,021 | B1 * | 6/2004 | Nguyen-Nhu | 348/362 |
| 7,167,280 | B2 * | 1/2007 | Bogdanowicz et al. | 358/406 |
| 2004/0085445 | A1 | 5/2004 | Park | |
| 2006/0125931 | A1 | 6/2006 | Jacumet | |

FOREIGN PATENT DOCUMENTS

| | | |
|---|---|---|
| EP | 0 884 895 A2 | 12/1998 |
| EP | 0 910 814 B1 | 4/1999 |
| WO | WO 96/31050 | 10/1996 |

OTHER PUBLICATIONS

International Search Report, dated Jun. 6, 2006, Corresponding to PCT/DE2006/000014.

Online Article "Cinelog Digital Video Assist Software," pp. 1-9, dated Feb. 5, 2002, XP-002372608, retrieved from the Internet on Mar. 15, 2006, URL: http://web.archive.org/web/20020205062357/http://videoassist.com/software.htm>.

* cited by examiner

METHOD FOR PROCESSING FILM IMAGES EXTRACTED FROM A FILM RECORDING BEAM PATH OF A MOVING IMAGE CAMERA

CROSS-REFERENCE TO A RELATED APPLICATION

This application is a National Phase Patent Application of International Patent Application Number PCT/DE2006/000014, filed on Jan. 4, 2006, which claims priority of German Patent Application Number 10 2005 001 652.9, filed on Jan. 10, 2005.

BACKGROUND

The invention relates to a method for processing film images which are extracted from a film recording beam path of a moving image camera, and to an apparatus for carrying out the method.

DE 103 01 714 A1 discloses a method for processing film images that are extracted from a film recording beam path of a moving image camera and are fed to an image sensor. The image sensor is arranged in an assist beam path of the moving image camera, said assist beam path being interrupted periodically depending on the image recording frequency of the moving image camera, converts the film images into digital assist signals and outputs them to a data processing device with an image frequency matching the image recording frequency of the moving image camera. The data processing device processes assist images derived from the digital assist signals with the image recording frequency of the moving image camera and outputs the digital assist signals for display of the assist images with an assist image frequency or the image recording frequency of the moving image camera to a digital storage device or for display of the assist images with a normalized image frequency, for example 24 images/s, to a monitor.

A video assist system disclosed in U.S. Pat. No. 4,928,171 for eliminating or reducing the image flicker that results from the periodic interruption of the recording beam path of the moving image camera depending on the image recording frequency of the moving image camera controls the video image sensor in a light-sensitive manner only when light is available in the video beam path, and stores the video signals of the video image sensor at the frequency of the video image sensor in a buffer memory. The video signals are read out from the latter with a standard-conforming video signal frequency, such that, independently of the film transport speed or image recording frequency of the moving image camera, the video output signal corresponds to the standard-conforming video image frequency and therefore does not deal with the peculiarities in the exposure of a moving image film.

By contrast, the method disclosed in DE 103 01 714 A1 enables film images extracted from a film recording beam path of a moving image camera to be processed in a manner adapted to the peculiarities of a moving image camera. In this case, for standard-conforming conditioning of the video signals for flicker-free representation of video frames or video fields, a digital assist image is generated in parallel with each film image and is recorded in real time, that is to say at the film transport speed of the moving image camera, and can be represented in real time or any other viewing speed. This ensures an entirely satisfactory representation of special effects generated by the moving image camera, such as slow-motion and quick-motion recordings.

In further video assist devices disclosed in the prior art, such as, for example, the video assist control system for a plurality of cameras that is disclosed in U.S. Pat. No. 6,353,461 B1, the data transmission from the camera or cameras is effected in analog fashion as a standard video signal, which later is digitized in a computer, so that no digital assist signals are generated in this case. Consequently, the resolution is fixed at the resolution defined in standard video of, for example 624 lines in standard PAL video and slow-motion and quick-motion effects cannot be cleanly processed and represented.

SUMMARY

It is an object of the present invention to extend the application spectrum of the digital assist images particularly in image processing, image analysis and image evaluation, to increase the functional reliability in the transmission of the digital assist images, and to enable a central processing of the digital assist images that are derived from a plurality of moving image cameras on a set.

The method according to the invention enables a processing—which is independent of the video frequency—of the film images at the digital level with any desired image frequency (frame rate) or as single images, ensures a high functional reliability in the transmission of the digital data in the form of the digital assist images to an image processing and/or storage unit, particularly in the case of a non-cable-based transmission of the digital assist signals, an extension of the application spectrum of the generated digital assist images in image processing, image analysis and image evaluation and enables the digital assist signals and metadata of a plurality of moving image cameras on a set to be stored and/or processed centrally.

With the solution according to the invention, the digital assist signals and digital assist images and assist image sequences are processed and/or stored in the digital domain, so that no analog/digital or digital/analog conversion is required for the postprocessing. On account of the variable number of film images per second, that is to say on account of a variable frame rate, and also aim to video the signals being dispensed with, the postprocessing of the digital assist images is frequency-independent and also independent of the type of image sensor and can be performed without being fixed to a specific number of lines of a video image. What is more, the image processing, image analysis and image evaluation of the digital assist images at the digital level enables the use and the application of numerous image processing, documentation and management programs developed for personal computers.

In this case, the solution according to the invention is based on the concept of processing, analyzing and representing the digital assist images composed of the digital assist signals in electronic data processing devices using the means of EDP, and of using them for controlling camera functions and also functions of devices connected to the moving image camera, that is to say digitally processing and outputting them not as an image sequence with a fixed image frequency of a video system or at a frequency dependent on the moving image camera, but rather as single images, image sequences or image element of a digital assist image.

In one exemplary embodiment the digital assist signals and metadata of the moving image camera which are exchanged between a camera module connected to a moving image camera and a processing unit are encrypted, in which case only the metadata, only the digital assist signals or both the metadata and the digital assist signals can be encrypted.

The encryption of the transmitted data and signals significantly increases the functional reliability of the processing method and, particularly in the case of a non-cable-based data and signal transmission, prevents unauthorized interception of digital assist signals and hence film images or metadata of the moving image camera or of devices connected to the moving image camera.

The processing unit may comprise a personal computer or a recording unit. The metadata are in particular recording, control and/or status signals of the moving image camera and of devices connected to the moving image camera, such as lens control devices, monitoring devices for film cartridges and the like.

Since the data and signals recorded in the processing unit are processed further in digital form, functions which previously required a considerable postprocessing outlay can be realized in a simple manner. Thus, by way of example, when using anamorphic lenses in the camera lens in order to increase the film image density on the moving image film, it is possible to perform an anamorphic rectification for changing the image geometry at the digital level in the processing unit using the customary transformation techniques of image processing programs. It is likewise possible to perform an electronic zoom or the selection of an image exert from the digital assist signals corresponding to the recorded film images or to influence the color, the contrast and/or the brightness of the recovered film images by digitally altering the assist signals.

The postprocessing of the digital assist signals can be effected during the reading in of the metadata and digital assist signals, during a reproduction of the film images corresponding to the digital assist signals, or can take place during a separate operation for converting the data and signals between the reading in and the reproduction.

An exemplary configuration of the method according to the invention consists in providing an auto-record mode, which makes it possible, by means of the processing unit, to record metadata and assist signals automatically when the moving image camera is started, and to end the recording of metadata and digital assist signals automatically when the moving image camera is stopped. This ensures that each exposure of the moving image film is recorded by means of the digital assist signals, even if the inputting of a recording command was forgotten or deliberately not performed.

The extended functionality of the processing unit additionally makes it possible to edit and string together individual assist images or assist-image image sequences in different orders at the digital level. In this case, a plurality of assist-image image sequences can be displayed graphically, for example in the form of thumbnails, on a user interface of the processing unit and thus enable simple access to individual assist images or assist-image image sequences for reproduction of the film images.

For image analysis and image evaluation, according to a further feature of the method according to the invention, the frequency distribution in the digital assist images that are composed of the digital assist signals and reproduce the film images can be analyzed during a variation of the focusing of the camera, the proportion of high frequencies in the different focus settings is determined and the focus of the camera lens is set to a value at which a digital assist image has a maximum of high frequencies.

Since the image processing is carried out at a digital level, a passive autofocus system with contrast measurement is used for an automatic image sharpness setting since the assist images recorded for contrast assessment are made available any way by the optoelectronic transducer. In this case, the processor contained in the processing unit calculates the frequency distribution in the image and determines from the proportion of high frequencies the image sharpness, which can either be displayed numerically or graphically on a monitor or be used for the automatic focusing of the camera.

In one exemplary embodiment the camera lens is adjusted over a focusing range and the assist images are coupled to the metadata of each focus setting, the energy of the high frequency bands of each assist image is determined, the determined values are stored temporarily and compared with one another for each focus setting and the focus of the camera lens is set to a value at which the energy of the high frequency bands of the assist image is maximal.

The area to be brought into focus in the image, e.g. an actor's face, is marked on the processing device for example by drawing a frame around the relevant object. The image analysis takes place only within the area indicated.

As an exemplary embodiment, the energy of the high frequency bands of each assist image is determined and the determined values are represented numerically or graphically preferably in the form of a moving bar on a monitor connected to the processing unit.

In this case, the adjustment of the lens can preferably be effected by motor, but it is also possible for the user to go over the area and perform the focusing to maximum sharpness values manually.

Furthermore, it is possible to check the image analysis and image evaluation by means of a check of the exposure of specific areas in a digital assist image by analyzing the brightness of the digital assist images that are composed of the digital assist signals and correspond to the film images taking account of the brightness relationship between the film images and the digital assist images, by comparing the brightness of the pixels of the assist image with at least one predetermined limit value and outputting an over- or underexposure signal if the pixels of an image area of the digital assist image overshoot or undershoot the predetermined limit value or values, the assist images preferably being converted into black/white images and the brightness of the pixels of the assist images being analyzed.

Given a known transfer function of the brightness in the assist beam path and a known sensitivity of the optoelectronic transducer and of the film used in the moving image camera, it is therefore possible to identify image areas of the digital assist images in which the moving image film is over- or underexposed.

The over- or underexposed image areas can be highlighted visually, in particular by means of false colors or hatching in the digital assist image, or the brightness values of the pixels are assigned to predetermined brightness classes which are displayed graphically in gradated fashion, preferably in different color representations, in relief form or in topographical representation.

Since the dynamic range of a moving image film is very much higher than the dynamic range of an optoelectronic transducer, it is necessary, besides a different electronic amplification, also to vary the iris diaphragm in the assist optical system of the assist beam path by motor and to additionally take into account for the transfer function of the brightness the fact that there is, between the image center and the image edge, a brightness decrease on account of the beam constriction in the assist beam path or different pupil positions of the lenses used. For this purpose, the brightness relationship between the film images and the digital assist images is stored in tabular fashion in the processing unit taking account of the diaphragm setting of the assist optical system, the recording lens and the iris setting thereof or the optical components arranged in the assist beam path, and the brightness values of the pixels of the digital assist images are corrected depending on the image areas within a digital assist image taking account of the data and/or the iris setting of the camera lens used.

A further possibility of digital image analysis and image evaluation consists in electronically compensating for the structure of the ground glass screen which is arranged in the beam path extracted from the recording beam path and which has an effect like a constant image disturbance during the image processing image analysis and image evaluation, by means of reading in the ground glass screen structure without film image recording and storing it as correction image. In this case, the so-called fixed pattern noise of the optoelectronic transducer is simultaneously detected and stored together with the pattern of the ground glass screen structure. During a subsequent film recording, the stored pattern is subtracted pixel by pixel from the currently incoming assist images and therefore leads to an image freed of the ground glass screen structure and the fixed pattern noise of the optoelectronic transducer.

Since the ground glass screen structure has a greater effect, the further the camera lens is stopped down, according to a further feature of the invention a correction image amplification dependent on the iris setting of the camera lens used is provided or a plurality of correction images dependent on the iris diaphragm of the camera lens are stored.

An exemplary apparatus for carrying out the method has a camera module which is connected to the moving image camera and which contains an image sensor arranged in an assist beam path extracted from the film recording beam path of the moving image camera, and an interface and/or a controller, which, on the input side, has applied to it mirror diaphragm signals derived from the position of a rotating mirror diaphragm of the moving image camera and recording, control and/or status signals of the moving image camera and of devices connected to the moving image camera and is connected to an input apparatus for manual inputting of control signals and data and, on the output side, outputs control signals to the image sensor and also digital assist signals derived from the output signals of the image sensor and digital metadata derived from the recording, control and/or status signals of the moving image camera and also of devices connected to the moving image camera to a processing unit and receives control signals from the processing unit, which, on the output side, is connected to a digital network and/or outputs control signals, analog or digital video signals to at least one monitor and/or the devices connected to the moving image camera and/or a recording device (video recorder).

BRIEF DESCRIPTION OF THE DRAWINGS

The concept on which the invention is based will be explained in more detail on the basis of an exemplary embodiment illustrated in the drawing, in which.

DETAILED DESCRIPTION

Figure 1:
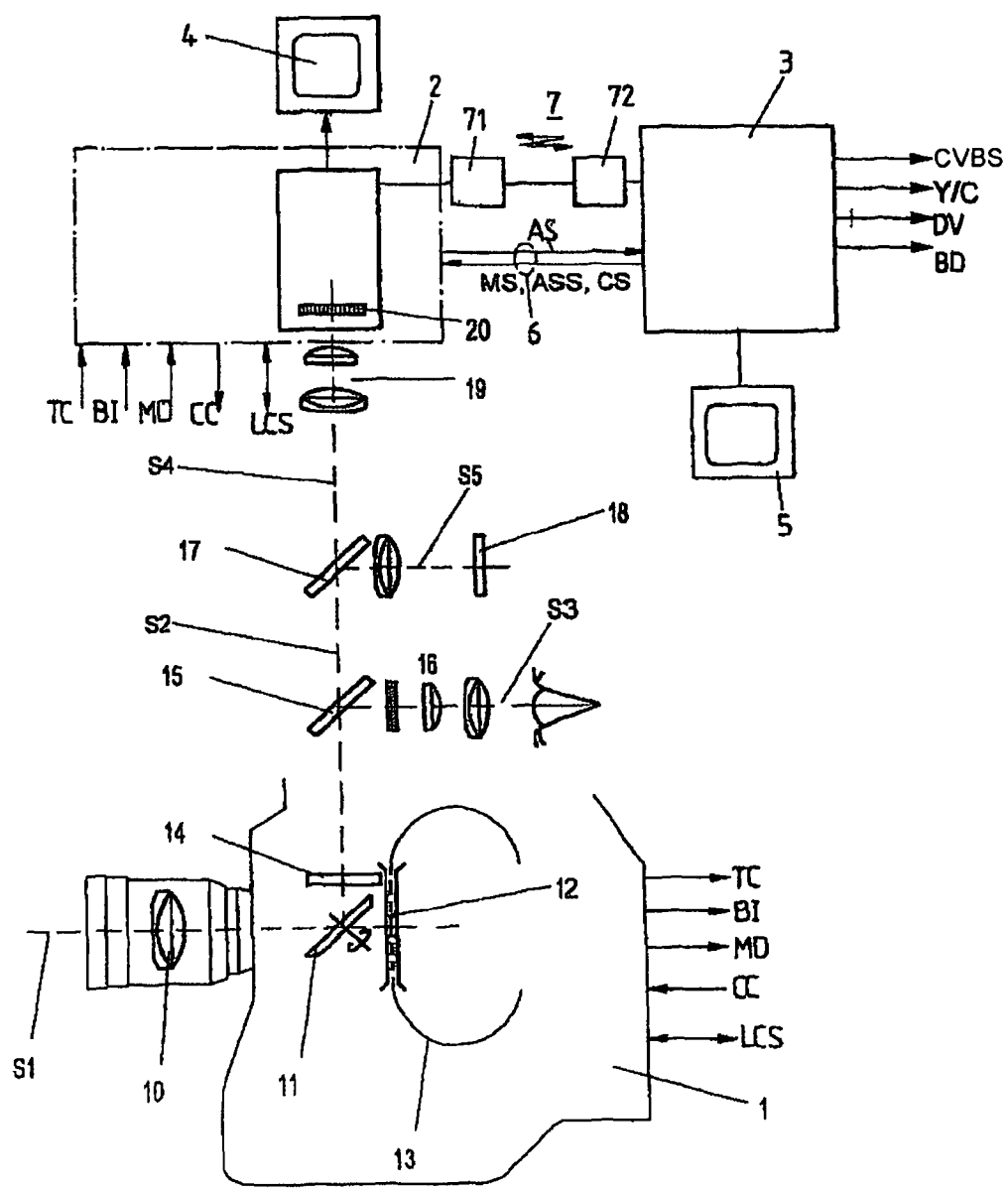
FIG. 1 shows a schematic illustration of the recording, viewfinder and assist beam path of a moving image camera with a camera module connected to the moving image camera and with a central processing unit.

The optical system illustrated schematically in FIG. 1 of a moving image camera 1 with a camera assist device 2,3 shows a recording lens 10, through which a recording beam path S1 enters into the moving image camera 1 and impinges on a rotating mirror diaphragm 11. The rotating mirror diaphragm 11 is usually composed of a semicircular mirror surface with a circumferential angle of usually 180° and a diaphragm adjusting blade which is arranged coaxially with respect to the mirror surface and which is adjustable relative to the mirror surface, such that diaphragm aperture angles of 0° to 180° of the rotating mirror diaphragm 11 can be set.

Depending on the angular position of the rotating mirror diaphragm 11, the recording beam path S1 impinges on the opening sector (bright sector) of the rotating mirror diaphragm 11 and passes through an image window 12 onto a moving image film 13 guided in a film channel. During the transport of the moving image film 13, the image window 12 is covered by the mirror surface of the rotating mirror diaphragm 11 and the recording beam path S1 is deflected onto a ground glass screen or fiber plate 14, from where the recording beam path S1 passes through a first beam splitter 15, which splits off a viewfinder beam path S3 from the recording beam path S1 into an eyepiece 16, through which the cameraman can view the image on the ground glass screen or fiber plate 14.

The beam part S2 of the recording beam path S1 that passes through the first beam splitter 15 possibly also passes to a second beam splitter 17, which splits the beam part S2 into an exposure meter beam path S5 for an exposure meter 18 and an assist beam path S4.

The assist beam path S4 passes through an assist optical system 19 to a camera module 2 having an image sensor 20, which converts the optical film image into image signals. The camera module 2 furthermore receives a diaphragm index signal BI from the moving image camera 1, which signal corresponds to the position of the rotating mirror diaphragm of the moving image camera 1 with respect to the recording beam path S1 and corresponds to the respective exposure conditions of the assist beam path S4 and thus to the exposure conditions on the image sensor 20, camera status data and camera status signals or metadata MD, such as, for example, the film transport speed, information about the moving image film consumption, for example in the form of the signals output by a film length counter, the charge state of the accumulator, information about the camera lens in the form of the zoom, focus and/or iris setting and the like and also time code signals TC, for example in the form of the longitudinal time code (LTC).

The camera module 2 is connected to the processing unit 3, which comprises a data processing unit in the form of a personal computer or a recording unit, for example a hard disk stack with a controller or some other storage unit, for example a tape drive with controller for recording data and the construction and function of which is explained in more detail on the basis of the block diagram in accordance with FIG. 4 that is described below.

The wireless transmission device 7 comprises for example microwave transceivers 71, 72 using a spread spectrum transmitting/receiving technology, a Bluetooth or W-LAN transmission technology or the like and includes a wireless connection to operator-side control units (not illustrated). In order to obtain a high data integrity, a special protocol with an automatic CRC check is used, which is adopted together with hardware technology from the radio LANs from computer technology. The devices usually operate in the frequency range of 2.4 to 2.5 GHz, which is realized for unlicensed data transmission in many countries. This device technology enables reliable and operator-friendly incorporation of control computers into the camera and lens control in conjunction with a camera-specific software driver.

The camera module 2 outputs the digital assist signals AS generated from the image signals and also the recording, control and/or status signals of the moving image camera 1 as metadata MD to the processing unit 3 and receives
  control and data signals ASS, CC and LCS for the moving image camera 1 such as recording speed, diaphragm aperture angle of the mirror diaphragm and suchlike camera accessories connected to the moving image camera 1, such as, for example, desired values for the iris, zoom and focus setting of the camera, and
  a mode select signal MS that predetermines a desired exposure mode from the processing unit 3.

The camera module 2 outputs camera control signals CC to the control electronics of the moving image camera 1 for the setting of camera and accessory desired values and enables, through the connection of a monitor 4, the assist images composed of the digital assist signals AS to be viewed directly at the camera module 2 and thus at or in direct proximity to the moving image camera 1.

The processing unit 3 has a plurality of outputs via which a CVBS, Y/C and DV (digital video) signal and also a signal BD containing image data are output to a local area network, a PAL or NTSC video device and to any desired storage unit. The composite color, video, blanking and syncs signal CVBS results from the combination of luminance and chrominance signals, while the Y/C signal corresponds to the two components of luminance Y and chrominance C of the total color video signal that are transmitted separately on dedicated lines. The DV signal involves a digital recording format used in consumer video recorders or consumer camcorders.

The central processing unit 3 can optionally be connected to a monitor 5, on which the film images recorded by the individual moving image cameras 1 with camera modules 2 or other control signals or data that are required for image analysis and image evaluation are displayed, for example, by means of a corresponding changeover device.

Figure 2:
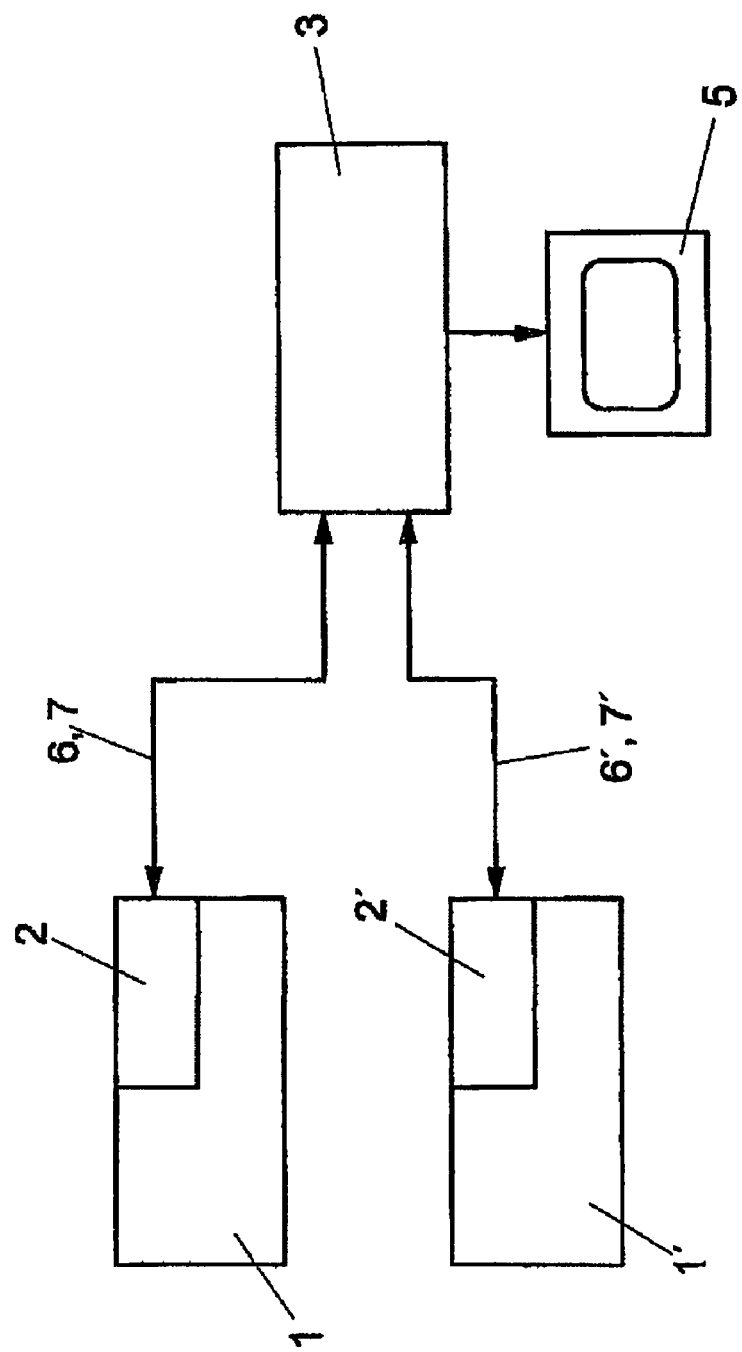
FIG. 2 shows a block diagram of an arrangement of two camera modules connected to a central processing unit.

The connection of a camera module 2 assigned to a moving image camera 1 and of a further camera module 2' assigned to a moving image camera 1' to a central processing unit 3 is illustrated schematically as a block diagram in FIG. 2.

Each of the two camera modules 2, 2' is assigned to a moving image camera 1, 1' of a film set and connected via a control and data bus 6 and 6', respectively, or a wireless transmission device 7 and 7', respectively, to the central processing unit 3, which drives the monitor 5, inter alia. If further moving image cameras are provided, then they are likewise coupled to a camera module which is in each case connected via a control and data bus or a wireless transmission device to further inputs of the processing unit 3.

Figure 3:
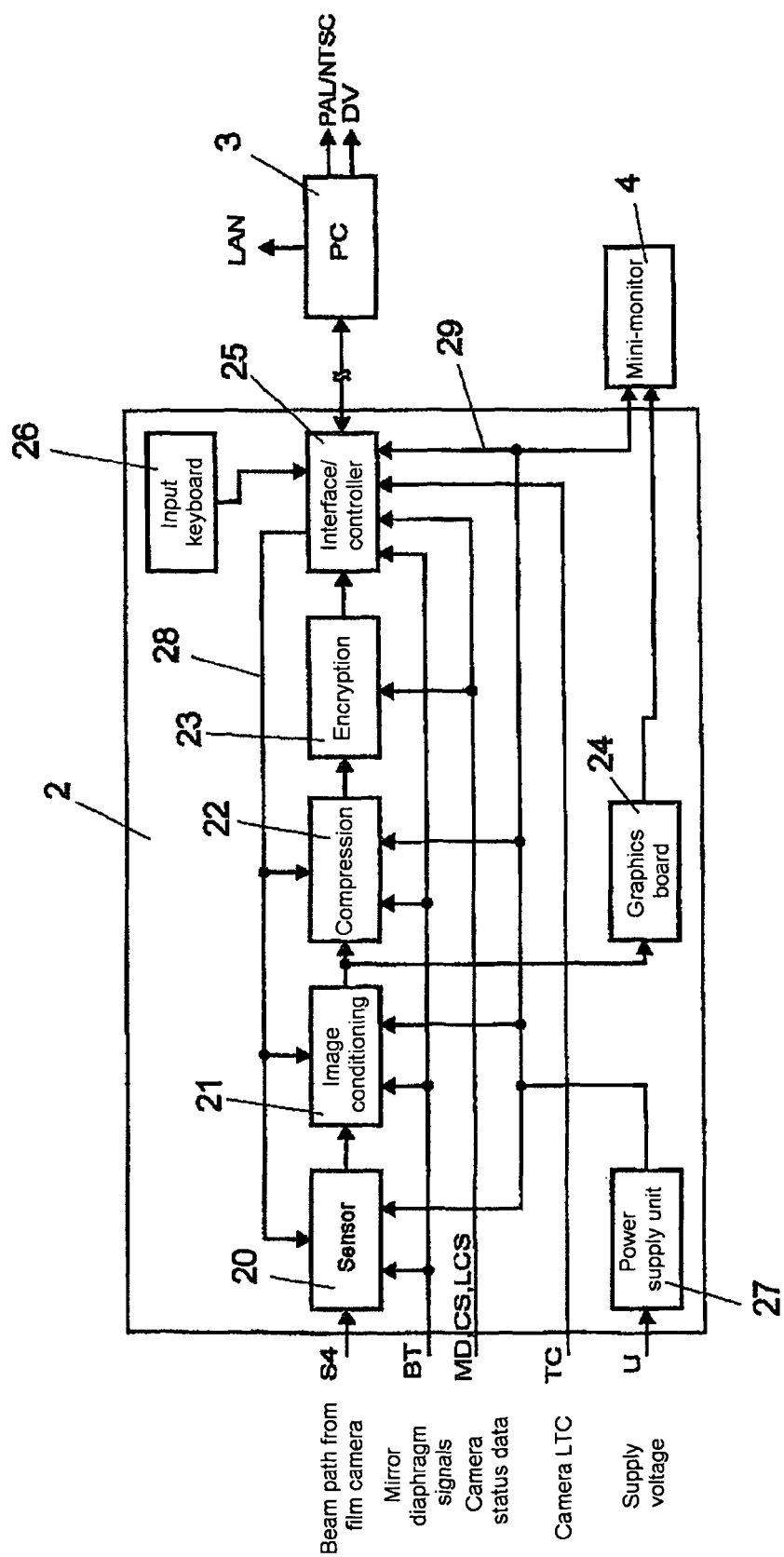
FIG. 3 shows a block diagram of the structure of the camera module in accordance with FIG. 1.

The block diagram illustrated in FIG. 3 of the camera module 2 in accordance with FIGS. 1 and 2 contains the image sensor 20 arranged in the assist beam path S4 in accordance with FIG. 1, an image conditioning device 21, a data compression device 22, an encryption device 23, a graphics board 24, an interface/controller 25 and also an input keyboard 26 and a power supply unit 27. The diaphragm index signal BI, which is applied to an input of the camera module 2 and corresponds to the position of the rotating mirror diaphragm of the moving image camera, is fed to an input of the image sensor 20, of the image conditioning device 21, of the data compression device 22 and of the interface/controller 25, the necessary signal timing in each stage being adapted to the necessary conditions, or being offered ready in the controller for each of the other units. The camera status signals CS and metadata MD and also, for example, camera lens control signals LCS that are applied to a further input of the camera module 2 are fed both to the encryption device 23 and to the interface/controller 25, which additionally receives a time code signal TC, e.g. in the form of a longitudinal time code (LTC), input via a further input of the camera module 2.

A supply voltage U applied to a voltage terminal of the camera module 2 is fed to the power supply unit 27, which supplies the image sensor 20, the image conditioning device 21 and the interface/controller 25 with one or more regulated, constant voltages via a line 29.

The interface/controller 25 drives both the image sensor 20 and the image conditioning device 21 and the data compression device 22 via a control bus 28.

The encryption device 23 arranged between the data compression device 22 and the interface/controller 25 in the block diagram of the camera module 2 can alternatively also be inserted into the connection of the image conditioning device 21 to the data compression device 22. The output of the image conditioning device 21 is connected to an input of the graphics board 24, which is connected to an input of a monitor 4, which is connected to the interface/controller 25 via a signal line 29.

Figure 4:
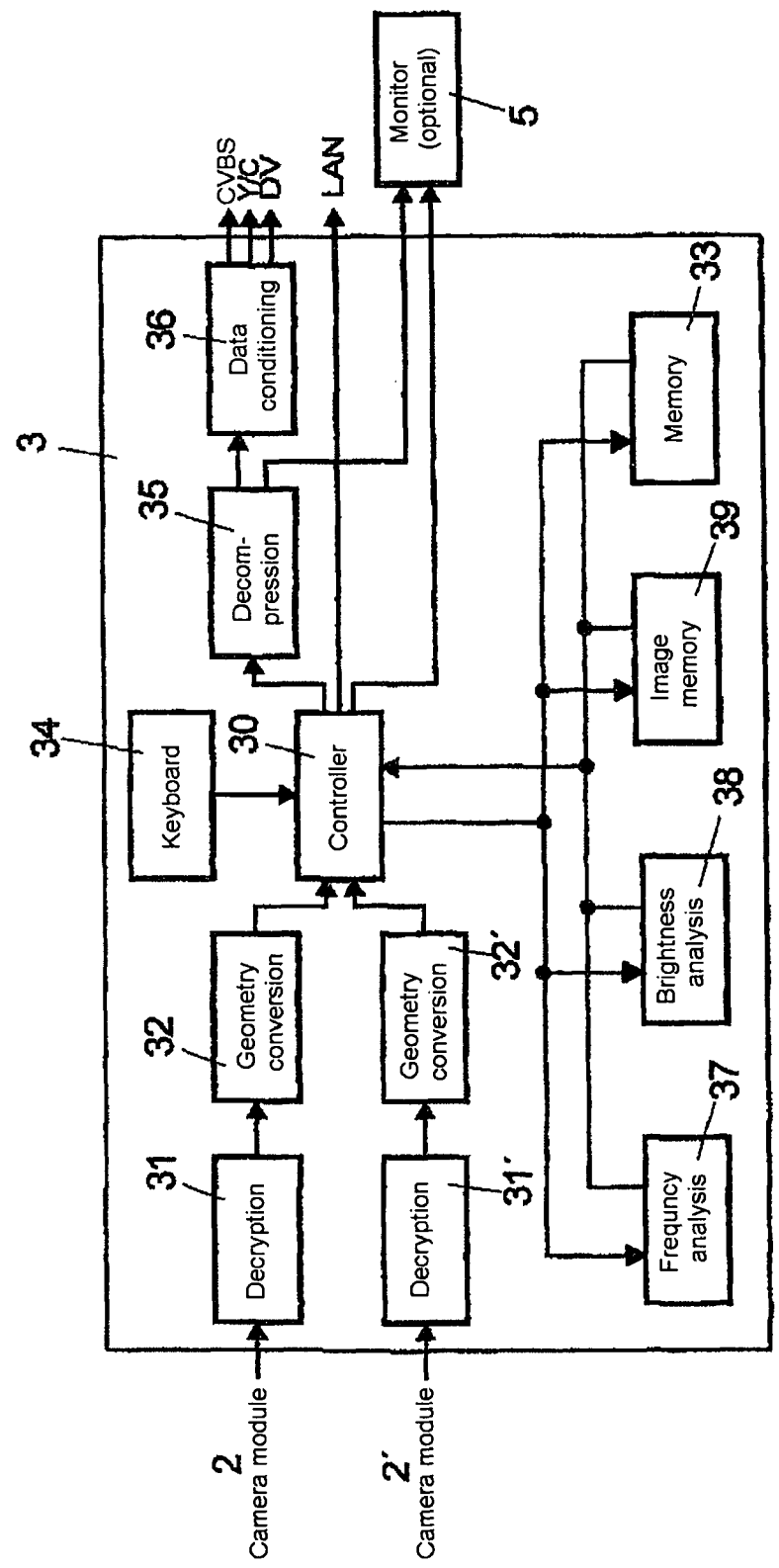
FIG. 4 shows a block diagram of the structure of the processing unit in accordance with FIG. 1 and 2.

The structure of the processing unit 3 that is illustrated as a block diagram in FIG. 4 has a plurality of inputs which are formed in each case with a camera module 2, 2' corresponding to the above-described camera module 2 illustrated in FIG. 3. Although only two inputs connected to the camera modules 2 and 2' are provided in the exemplary embodiment in accordance with FIG. 4, the exemplary embodiment can also be extended to further camera modules which are to be connected to the processing unit 3 and which are in each case connected to an input of the processing unit 3 via a control and data bus or a wireless transmission device.

The processing unit 3 contains a plurality, too in the present exemplary embodiment, of decryption devices 31, 31', and also geometry conversion devices 32, 32', which process the output signals of the camera modules 2, 2'. A controller 30 is connected, on the input side, to the geometry conversion devices 32, 32', to an input keyboard 34 and also to a memory 33. Outputs of the controller 30 are connected to a decompression device 35, a local area network LAN and also to the monitor 5 which is optionally to be provided and which is connected by a further input to an output of the decompression device 35. A further output of the decompression device 35 is connected to an input of a data conditioning device 36, at the outputs of which the CVBS, Y/C and DV signals are output.

The geometry conversion devices 32, 32' assigned to the individual camera modules 2, 2' can be replaced by one geometry conversion device which is common to all the camera modules 2, 2' and which is inserted into the connection between the controller 30 and the decompression device 35.

The processing unit 3 can optionally contain a frequency analysis device 37, a brightness analysis device 38 and an image memory 39, the construction and function of which are explained in more detail below with reference to FIGS. 5 to 7.

The exemplary embodiment described above and illustrated in FIGS. 1 to 4 illustrates the possibilities of processing the digital assist signals AS at the digital level with the inclusion of the metadata and control signals derived from the moving image camera 1 and the ancillary devices thereof. In this case, the data and signal encryption, the geometry conversion, the image processing by zooming, selection of an exert and alteration of the color, the color intensity, the contrast and the brightness of the film images generated from the digital assist signals and also the various possibilities of electronic film editing by separating and combining as desired individual recordings or recording sequences and the graphical representation thereof as thumbnails on the user interface of the processing unit represent only a selection of the processing possibilities for the digital assist signals at a digital level.

Further functions that can be realized with the camera modules and the processing unit in accordance with FIGS. 3 and 4 in addition to slow-motion and quick-motion functions include mixing functions in the combination of film images from different moving image cameras whose camera modules are connected to the processing unit in accordance with FIG. 4, and also documentation and management functions.

The number of camera modules 2 in accordance with FIG. 3 connected to the processing unit 3 in accordance with FIG. 4 is not restricted to the two camera modules illustrated in this exemplary embodiment, but rather can also be extended to any number of camera modules corresponding for example to the number of moving image cameras on a film set.

Figure 5:
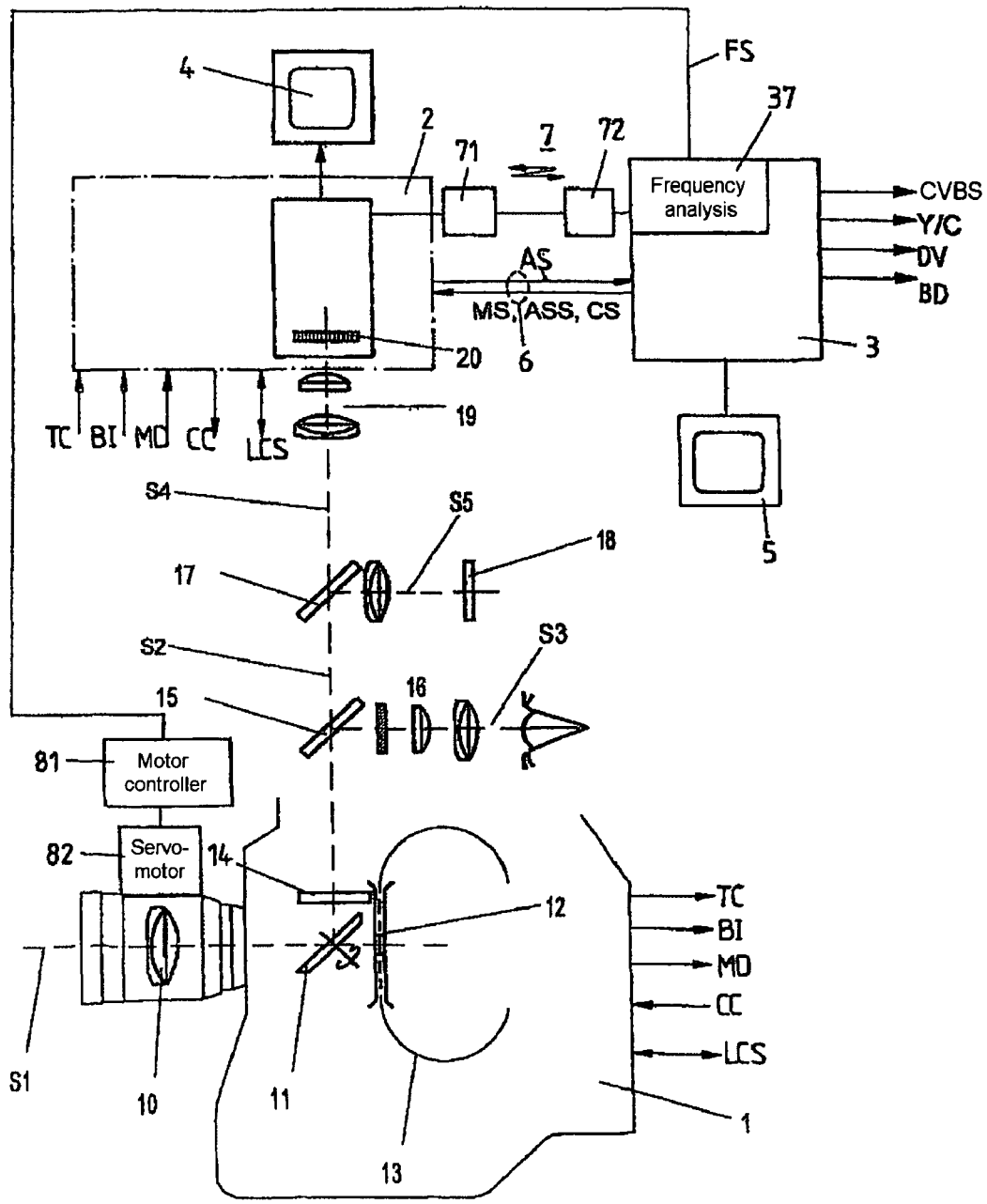
FIG. 5 shows a schematic illustration as in FIG. 1 with a frequency analysis device for the focusing of the camera lens or focus representation.
Figure 6:
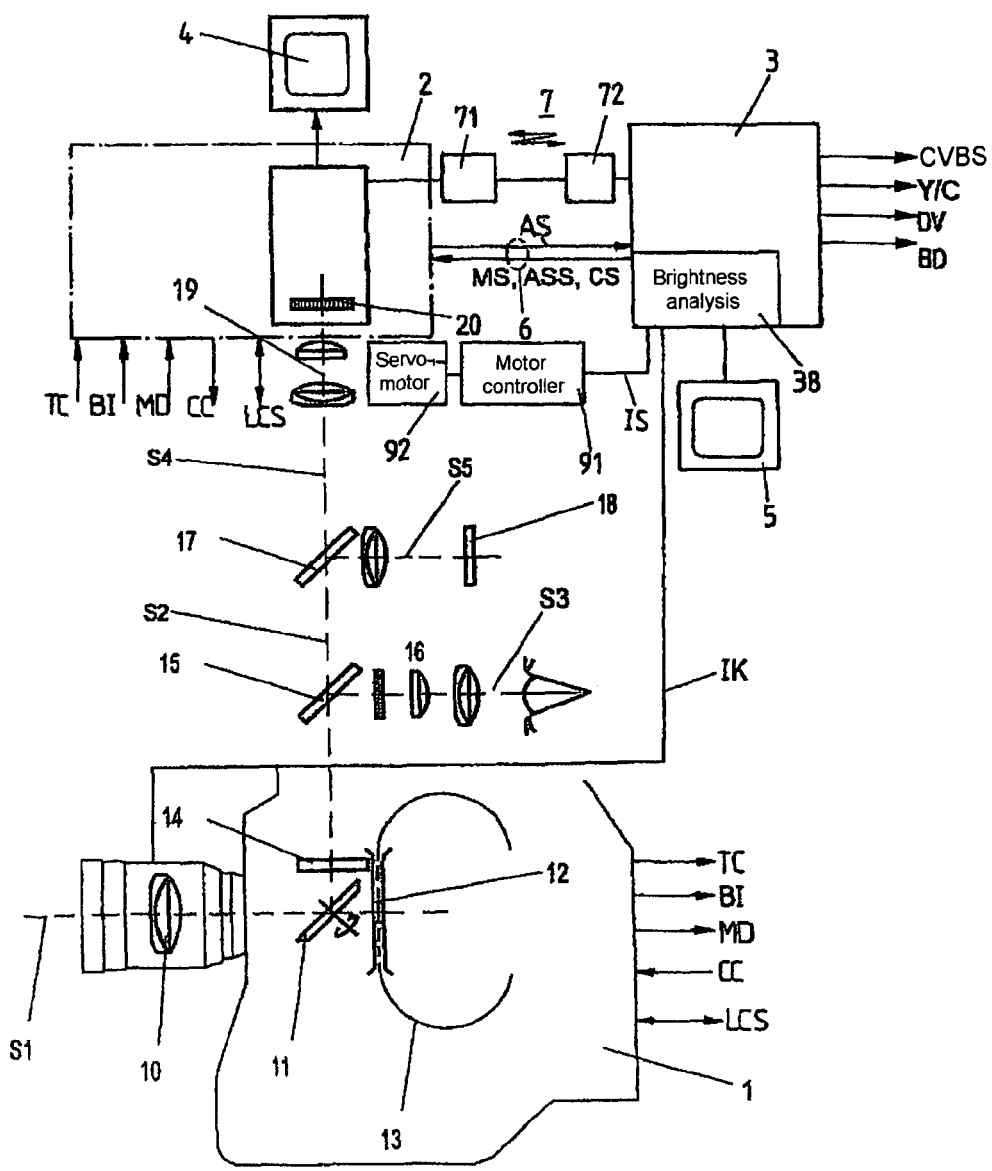
FIG. 6 shows a schematic illustration as in FIG. 1 with a brightness analysis device for determining and displaying over- and/or underexposures.
Figure 7:
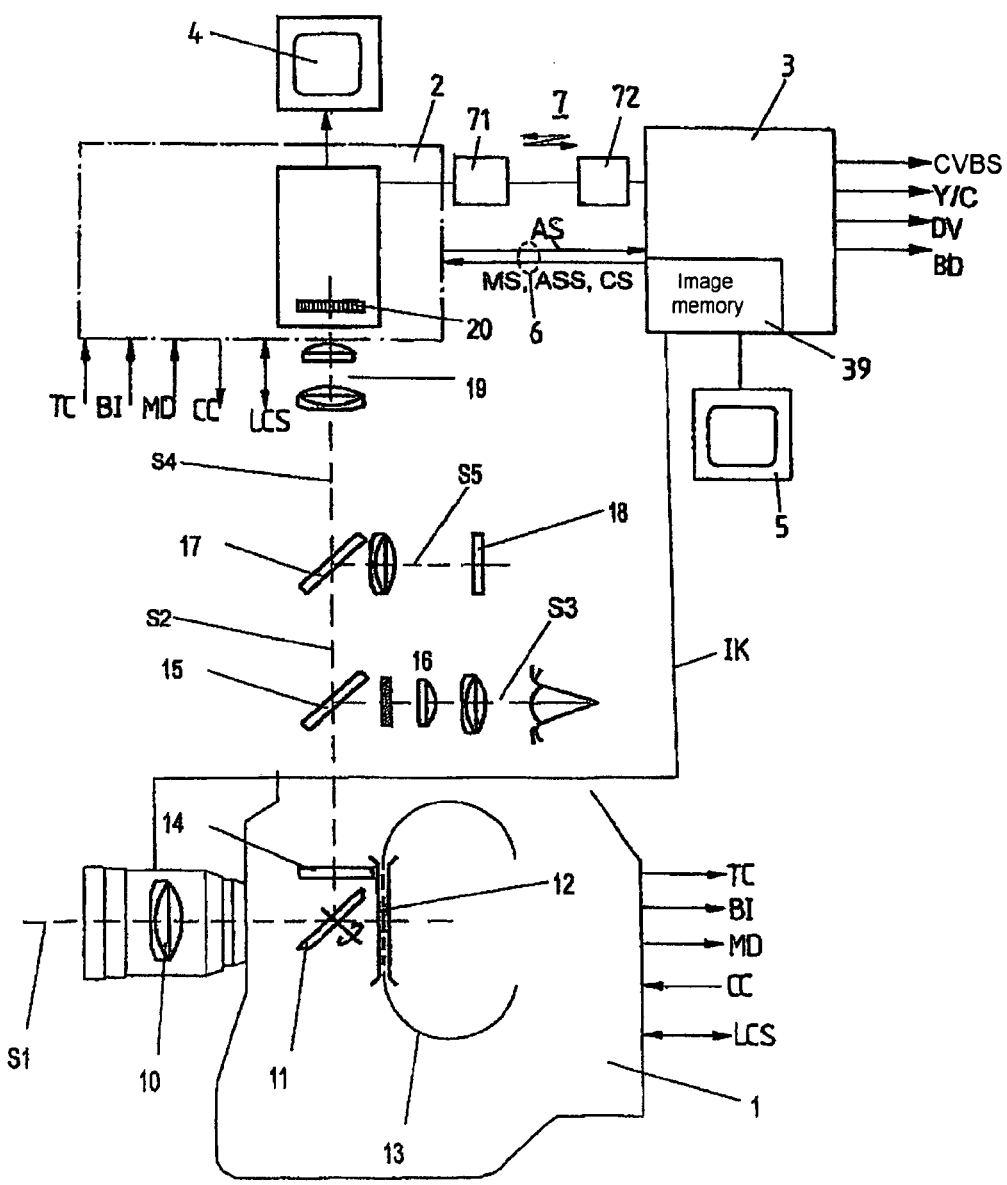
FIG. 7 shows a schematic illustration as in FIG. 1 with a device for compensating for the ground glass screen structure.

The FIGS. 5 to 7 illustrate selected examples of image analysis and image evaluation for film image viewing or controlling functions of the moving image camera or of devices connected to the moving image camera, such as the camera lens. In this case, the possibilities of image analysis and image evaluation are not restricted to the exemplary embodiments illustrated, since further possibilities arise from the digital processing in conjunction with corresponding data processing devices using existing software or software especially developed for the image processing.

FIG. 5 shows, in a schematic illustration, the recording beam path S1, a view finder beam path S3 and assist beam path S4 of the moving image camera 1 with the camera module 2 connected to the moving image camera 1, and the central processing unit 3, into which a frequency analysis device 37 is integrated. The frequency analysis device 37 contains a frequency or spectral analyzer, which is constructed as an FFT (Fast Fourier Transformation) analyzer or as an analyzer according to the principle of the heterodyne receiver and either calculates the frequency spectrum of a signal detected in the time domain by means of discrete Fourier transformation or, in a manner known per se, tunes the frequency band to be measured according to the present voltage level of a sawtooth generator. For this purpose, the frequency analysis device 37 has applied to it the digital assist signals AS and the metadata MD, in particular the focus setting of the camera lens 10.

For the automatic focusing of the camera lens 10 and/or for displaying the focusing setting of the camera lens 10, the frequency analysis device 37 in conjunction with the processor of the image processing unit 3 calculates the frequency distribution in a video assist image or the predetermined areas thereof and determines the sharpness setting of the camera lens 10 from the proportion of high frequencies in the digital assist image. If the camera lens 10 has been brought into focus, then a large amount of energy is found in the higher frequency ranges of the digital assist image, so that the frequency analysis device 36 can output a signal that produces a maximum with maximum focusing of the camera lens 10.

As a result of a focusing signal FS being output to a motor controller 81 for driving a servomotor 82 connected to the camera lens 10, the camera lens 10 is adjusted over the focusing setting range and the frequency analysis device 37 determines the energy in the high frequency bands of the digital assist image. The processor integrated into the processing unit 3 stores the proportions of high frequencies at the individual focusing settings and outputs a focusing signal FS to the motor controller 81, with which signal the servomotor 82 brings the camera lens 10 to the setting at which the maximum of high frequency components and hence maximum image sharpness was detected.

As an alternative or in addition, the frequency analysis device 37 outputs a display signal to the monitor 4, 5 which initiates a numerical display in the form of a numerical value or a graphical display for example in the form of a moving bar. On the basis of the numerical or graphical display, the user can run through the focus setting of the camera lens 10 and determine the maximum display value.

Provision may furthermore be made for isolating an image area that is to be sharply focused from the entire digital assist image, in which a frame is indicated around the image area on the video assist monitor for example by using a computer mouse to draw up a rectangle, within which the frequency analysis is to be effected. This ensures that the desired image area, which includes an actor, for example, and not the remaining area of the digital assist image is focused.

FIG. 6 shows, in a schematic illustration, the recording beam path S1, view finder beam path S3 and assist beam path S4 of the moving image camera 1 with the camera module 2 connected to the moving image camera 1, and the central processing unit 3, into which a brightness analysis device 38 is integrated and has applied to it the digital assist signals AS and also a signal IK indicating the iris setting of the camera lens 10 and outputs, on the output side, an iris control signal IS to a motor controller 91 for driving a servomotor 92 connected to the assist optical system 19, and also a display signal to at least one of the monitors 4, 5. The brightness analysis device 38 makes it possible to determine areas in the digital assist image and hence in the film image that are over- or underexposed. By means of the known brightness relationship between the film exposure taking account of the film sensitivity, on the one hand, and the optoelectric transducer 20, on the other hand, it is ensured that under- or overexposed areas on the moving image film are too dark or too bright in the digital assist image as well. In this case, the respective brightness depends on the iris diaphragm in the assist optical system 19, so that depending on the setting of the iris diaphragm in the assist optical system 19 and depending on the film type used, the under- or overexposure of specific areas in the film image can be identified if the assist image is too bright or too dark in the relevant area.

Accordingly, a relationship between the brightness on the moving image film and the brightness of the digital assist signals AS output by the optoelectronic transducer 20 is established from the optical components in the assist beam path S4 and the position of the iris diaphragm in the assist optical system 19 and the values derived therefrom are stored in a table store of the processing unit 3. For optimal brightness detection, the assist image is converted into a black/white image and all pixels or pixels of a selected area of the assist image are sampled with regard to their brightness. By defining upper and lower limit values for an over- and underexposure of a film image or only the upper or lower limit value, the fact of whether the relevant limit value is overshot or undershot is determined during a comparison of the brightness values of the individual pixels with at least one of the two limit values. Areas that overshoot an upper limit value therefore indicate an overexposure of the film image, while areas that undershoot a lower limit value indicate an underexposure of the film image.

Under- or overexposed areas of a film image or digital assist image can be displayed in graphical representation, for example by means of false colors or in hatched form on at least one of the monitors 4, 5. As an alternative, the normal colored assist image can be displayed and a special representation can be superimposed only on the under- or overexposed image areas.

A further alternative consists in classifying the brightness of the individual pixels into brightness classes, for example brightness of 0 to 15, 16 to 31, 32 to 47, ..., 240 to 255, and displaying these for example 16 ranges in different color representations like on a map or as relief representation or topographical representation. From this representation, the user can visually assist the brightness distribution in the film image or digital assist image very rapidly.

Since the brightness transmission in the assist beam path S4 is not uniform because, as in all optical systems, the image corners are darker and this effect is additionally intensified by the use of specific lenses and iris settings of said lenses, provision may additionally be made for taking account of these zones of the digital assist image in the table indicating the brightness relationship between film image and optoelectronic transducer, and for enabling a differential detection of the transfer function. These additional data are taken into account by measuring the camera lenses used and by inputting these data into the table store of the processing unit 3.

It is possible to extend the entire measurement range by opening and closing the iris diaphragm of the assist optical system 19 by motor during a measurement cycle, which is effected by corresponding driving of the motor controller 91 by means of the iris control signal IS from the brightness analysis device 38. Since the dynamic range of the film is generally greater than the dynamic range of the optoelectronic transducer 20 and the transfer function depends on the iris diaphragm of the assist optical system, the measurement range can thus be extended.

FIG. 7 shows in a further application an image analysis and image evaluation for ground glass screen structure removal with a schematic illustration of the recording beam path S1, viewfinder beam path S3 and assist beam path S4 of the moving image camera 1 with the camera module 2 connected to the moving image camera 1, and the central processing unit 3, into which an image memory 39 is integrated, to which is applied a signal IK indicating the iris setting of the camera lens 10 and which outputs to at least one of the monitors 4, 5 a display signal freed of the structure of the ground glass screen 14 arranged in the mirroring-out beam path S2.

This additional image analysis and image evaluation is based on the insight that the ground glass screen 14 has a specific structure that can be discerned in the digital assist image. The recording of a neutral, for example uniformly grey, area by means of the moving image camera 1 results in a pattern of the ground glass screen structure, which is stored in a memory in the processing unit 3. In this case, the so-called fixed pattern noise of the optoelectronic transducer 20 is simultaneously detected and stored together with the pattern of the ground glass screen structure. During a film recording, the stored pattern is subtracted pixel by pixel from the currently incoming assist images and therefore leads to an image freed of the ground glass screen structure and the fixed pattern noise of the optoelectronic transducer.

Since the ground glass screen structure appears to a greater extent, the further the camera lens 10 is stopped down, it is necessary, if appropriate, to carry out an amplification of the fixed pattern image dependent on the setting of the iris diaphragm of the camera lens 10, or, as an alternative, a plurality of correction images dependent on the position of the iris diaphragm of the camera lens 10 are stored and taken into account during the subtraction from the film images currently being recorded.

The invention claimed is:

1. A method for processing film images which are extracted from a recording beam path of a moving image camera and which are converted into digital assist signals by an optoelectronic transducer arranged in an assist beam path of the moving image camera, said assist beam path being periodically interrupted depending on the image recording frequency of the moving image camera; said method comprising:
   outputting digital assist signals to a processing unit with an image frequency matching the image recording frequency of the moving image camera or with an assist image frequency, feeding recording signals, control signals and status signals of the moving image camera or of devices connected to said moving image camera as metadata to said processing unit,
   digitally recording in said processing unit digital assist images or assist image frequencies composed of said digital assist signals,
   digitally processing said digital assist images or assist image frequencies in said processing unit by means of
   image conditioning functions for processing said digital assist signals and said metadata in digital form with a predeterminable image frequency or individually to form conditioned digital assist images,
   image analysis functions for analyzing said digital assist images composed of said digital assist signals, and
   camera control functions,
   said image conditioning functions, image analysis functions and camera control functions being integrated in said processing unit,
   outputting control signals from said processing unit to control modules of said moving image camera or to said devices connected to said moving image camera, and outputting digital output data to a network or outputting analog or digital video signals to a monitor connected to said processing unit.

2. The method of claim 1, wherein said processing unit processes said digital assist signals at a digital level with the inclusion of the metadata and control signals derived from the moving image camera for at least one of said image conditioning functions, image analysis functions or camera control functions:
   data and signal encryption, geometry conversion, image processing by zooming, selection of an exert and alteration of the color, color intensity, contrast and brightness of the film images,
   electronic film editing by separating and combining desired individual recordings or recording sequences of said digital assist images or digital assist signals and the graphical representation thereof as thumbnails on the user interface of the processing unit.

3. The method of claim 1, comprising processing said digital assist signals by means of an input apparatus connected to the processing unit and/or programs stored in the processing unit for altering the image geometry, the color, the contrast and/or the brightness of the film images.

4. The method of claim 1, comprising:
  distorting the film images anamorphically by means of an anamorphic camera lens of the moving image camera; and
  rectifying anamorphically in the processing unit the digital assist images composed of the digital assist signals.

5. The method of claim 1, comprising selecting image excerpts of the film images by processing of the digital assist images by means of the input apparatus connected to the processing unit and/or are magnified by electronic zooming.

6. The method of claim 1, wherein the processing unit assigns digital assist signals to individual film images or film image sequences by means of the metadata, and the digital assist images that are composed of the digital assist signals and are assigned to the individual film images or film image sequences are joined together in a variable order by means of control signals that can be input via the input apparatus or can be called up by a control program.

7. The method of claim 6, wherein individual or a plurality of digital assist images or assist image sequences are represented on the user interface of a monitor connected to the processing unit, preferably in the form of thumbnails, and are selected and/or compiled by means of control signals that can be input via the input apparatus or can be called up by a control program.

8. The method of claim 1, wherein the digital assist signals and metadata are output from a plurality of camera modules connected to a respective moving image camera to inputs of the processing unit.

9. The method of claim 1, wherein the processing unit is operated in an auto-record mode for automatically recording digital assist signals and/or metadata while the moving image camera is running.

10. The method of claim 1, wherein the processing unit stores and processes the digital assist signals and metadata
  during the reading in of the digital assist signals and metadata, or
  during the signal and data outputting, or
  during a conversion of the metadata and digital assist signals between signal and data reception and signal and data outputting.

11. The method of claim 1, wherein the digital assist signals and/or metadata are encrypted prior to transmission to the processing unit and are decrypted in the processing unit, preferably at the input of the processing unit.

12. The method of claim 1, wherein the digital assist signals and/or metadata are exchanged via a control and data bus between the camera module and the processing unit.

13. The method of claim 1, wherein the digital assist signals and/or metadata are exchanged via a wireless transmission device, preferably via microwave transceivers, a Bluetooth or W-LAN connection, between the camera module and the processing unit.

14. The method of claim 1, wherein the processing unit is connected to at least one operator-side control unit in wireless fashion or via a control and databus.

15. An apparatus for processing film images which are extracted from a recording beam path of a moving image camera and which are converted into digital assist signals by an optoelectronic transducer arranged in an assist beam path of the moving image camera, said assist beam path being periodically interrupted depending on the image recording frequency of the moving image camera, which digital assist signals are output to a processing unit with an image frequency matching the image recording frequency of the moving image camera or with an assist image frequency, to which processing unit recording signals, control signals or status signals of the moving image camera or of devices connected to the moving image camera are fed as metadata, said apparatus comprising:
  a camera module, an interface or controller and said processing unit, said camera module being connected to the moving image camera and containing an image sensor arranged in an assist beam path extracted from the film recording beam path of the moving image camera;
  the input of said interface or a controller receiving mirror diaphragm signals derived from a position of a rotating mirror diaphragm of the moving image camera and recording signals, control signals or status signals of the moving image camera and of devices connected to the moving image camera,
  said interface or controller being connected to an input apparatus for manual inputting of control signals and data,
  said interface or controller providing on its output side control signals to the image sensor
  said interface or controller providing on its output side digital assist signals derived from the output signals of the image sensor and digital metadata derived from the recording signals, control signals or status signals of the moving image camera and also of devices connected to the moving image camera to a processing unit,
  said interface or controller receiving control signals (ASS, CC, LCS) from said processing unit,
  said processing unit comprising image conditioning functions means, image analysis functions means and camera control functions means for digitally recording in said processing unit digital assist images or assist image frequencies composed of said digital assist signals, digitally processing said digital assist images or assist image frequencies in said processing unit by means of said image conditioning functions means for processing said digital assist signals and said metadata in digital form with a predeterminable image frequency or individually to form conditioned digital assist images, said image analysis functions means for analyzing said digital assist images composed of said digital assist signals, and said camera control functions means,
  the output of said processing unit providing control signals to control modules of said moving image camera or to said devices connected to said moving image camera, and digital output data to a network or analog or digital video signals to a monitor and/or the devices connected to the moving image camera and/or a recording device.

16. The apparatus of claim 15, wherein time code signals of the moving image camera are additionally applied to the interface and/or the controller.

17. The apparatus of claim 15 or 16, wherein a color conditioning device is connected, on its input side, to an output of the image sensor and of the interface/controller and, on its output side, to an input of the interface/controller and has the mirror diaphragm signal applied to it.

18. The apparatus of claim 17, wherein an encryption device is arranged between the output of the color conditioning device and the input of the interface/controller and has applied to it the recording, status and/or control signals of the moving image camera and also of devices connected to the moving image camera.

19. The apparatus of claim 15, wherein an image compression device is arranged between the output of the color conditioning device and the input of the interface/controller and has applied to it, on its input side, control signals of the interface/controller and the mirror diaphragm signals.

20. The apparatus of claim 15, wherein the output of the color conditioning device is connected to a monitor via a graphics board.

21. The apparatus of claim 15, wherein the processing unit comprises a personal computer or a data recording unit with a controller, and is connected, on its input side, to at least one camera module and, on its output side, to at least one camera module and/or a local area network and/or a display device that processes standardized video signals.

22. The apparatus of claim 21, wherein the processing unit additionally outputs a digital video signal on the output side.

23. The apparatus of claim 21, wherein the processing unit contains at least one decryption device connected to the output of the camera module, a data conditioning device connected to an output of a controller, a geometry conversion device arranged between the decryption device and the controller or between the controller and the data conditioning device, and also a memory, which are connected to the controller.

24. The apparatus of claim 23, further comprising a decompression device arranged between the controller and the data conditioning device.

25. The apparatus of claim 24, further comprising a monitor connected, on its input side, to the controller and the decompression device.

26. A method for processing film images which are extracted from a recording beam path of a moving image camera and which are converted into digital assist signals, said method comprising:
   interrupting said assist beam path periodically based on the image recording frequency of the moving image camera;
   outputting digital assist signals with an image frequency matching the image recording frequency of the moving image camera or with an assist image frequency;
   receiving recording, control and/or status signals of the moving image camera or of devices connected to the moving image camera as metadata;
   processing the digital assist signals and metadata in digital form with a predeterminable image frequency or individually to form conditioned digital assist images and/or analyzing digital assist images composed of the digital assist signals and generating digital output data and control signals; and
   outputting said digital output data and control signals to control modules of the moving image camera or the devices connected to the moving image camera, to a network, or as analog or digital video signals to a monitor connected to the processing unit.

27. An apparatus for processing film images which are extracted from a recording beam path of a moving image camera and which are converted into digital assist signals comprising:
   a processing unit for receiving, digital assist signals with an image frequency matching an image recording frequency of the moving picture camera or with an assist frequency, and receiving recording, control and/or status signals of the moving image camera or of devices connected to the moving image camera as metadata;
   a camera module which is connected to the moving image camera and which contains an image sensor arranged in an assist beam path extracted from the film recording beam path of the moving image camera; and
   an interface and/or a controller receiving mirror diaphragm signals derived from a position of a rotating mirror diaphragm of the moving image camera and recording control and/or status signals of the moving image camera and of devices connected to the moving image camera, wherein said interface and/or controller is connected to an input apparatus for manual inputting of control signals and data and wherein said interface and/or controller outputs control signals to the image sensor and also digital assist signals derived from the output signals of the image sensor and digital metadata derived from the recording, control and/or status signals of the moving image camera and wherein said interface and/or controller receives control signals from the processing unit.

* * * * *

UNITED STATES PATENT AND TRADEMARK OFFICE
CERTIFICATE OF CORRECTION

| | | |
|---|---|---|
| PATENT NO. | : 7,948,522 B2 | Page 1 of 1 |
| APPLICATION NO. | : 11/794853 | |
| DATED | : May 24, 2011 | |
| INVENTOR(S) | : Klaus Jacumet | |

It is certified that error appears in the above-identified patent and that said Letters Patent is hereby corrected as shown below:

On the Title Page

(73) Assignee: Arnold & Ritcher Cine Technik GmbH & Co. Betriebs KG, Munich (DE)

Delete "Ritcher"
Insert --Richter--

Signed and Sealed this
Thirtieth Day of October, 2012

David J. Kappos
*Director of the United States Patent and Trademark Office*